United States Patent [19]

Richter et al.

[11] 4,380,991
[45] Apr. 26, 1983

[54] DRILLING DEVICE

[75] Inventors: Martin Richter, Freising; Wolfgang Erdt, Munich, both of Fed. Rep. of Germany

[73] Assignee: Hilti Aktiengesellschaft, Schaan, Liechtenstein

[21] Appl. No.: 173,374

[22] Filed: Jul. 29, 1980

[30] Foreign Application Priority Data

Jul. 30, 1979 [DE] Fed. Rep. of Germany ....... 2930856

[51] Int. Cl.³ .......................... B23B 41/00; B28D 1/14
[52] U.S. Cl. ................................ 125/20; 408/126; 408/145; 408/204; 74/325; 74/397
[58] Field of Search .................. 408/46, 35, 14, 124, 408/125, 204, 126, 145; 74/665 GA, 392, 397; 125/20

[56] References Cited

U.S. PATENT DOCUMENTS

| 103,912 | 6/1870 | Mitchell | 408/124 X |
|---|---|---|---|
| 1,449,164 | 3/1923 | Buhr | 74/665 GA X |
| 2,682,698 | 7/1954 | Berthiez | 408/35 X |
| 2,914,305 | 11/1959 | Wink | 173/163 X |
| 3,397,589 | 8/1968 | Moore | 74/397 |
| 3,515,100 | 6/1970 | Keller | 408/14 X |
| 3,519,092 | 7/1970 | Miller | |
| 3,550,701 | 12/1970 | Holley | 125/20 X |

*Primary Examiner*—Z. R. Bilinsky
*Attorney, Agent, or Firm*—Toren, McGeady and Stanger

[57] ABSTRACT

In a device for drilling rock, concrete, reinforced concrete and similar materials, a spindle is rotatably mounted in a housing and a drilling tool is replaceably mounted on the spindle so that the spindle and drilling tool rotate together. A gear wheel is fitted on the drilling tool. A motor is located on the housing laterally spaced from the axis of rotation of the spindle. The motor includes a drive pinion which drives an intermediate gear. The intermediate gear meshes with the gear wheel and drives the drilling tool and spindle. The spacing between the axis of the intermediate gear and the spindle is adjustable.

3 Claims, 4 Drawing Figures

DRILLING DEVICE

SUMMARY OF THE INVENTION

The present invention is directed to a device for drilling rock, concrete, reinforced concrete and similar materials and includes a housing, a spindle rotatably mounted in the housing, a drilling tool replaceably connected on the spindle, and a gear wheel fitted on the drilling tool with the gear wheel and drilling tool being driven by a driving pinion via an intermediate gear for transmitting rotational movement to the drilling tool.

In new buildings and in the renovation of old buildings, breakaways must be constructed in ceilings and walls mainly for installation purposes. In steel reinforced concrete, used almost exclusively at the present time, the reinforcing steel in the concrete must be cut. It is practically impossible to effect such a cutting with the known hard material tools. An additional cutting action of the reinforcing steel is required using oxygen flame torches or the like and such procedures are very time-consuming and expensive. For this reason, and especially for larger breakaway sections, diamond tipped tools have been used increasingly so that the reinforcing steel can be cut during the drilling operation.

Diamond tipped tools or drill bits work efficiently only when the cutting speed specified for each type is maintained exactly. Since the cutting speed depends directly upon the outside diameter of the drilling tool or bit, a practically stepless rotary drive, or a rotary drive having a number of speed stages, is required for the operating spindle. Such a drive unit is on one hand very expensive and on the other hand impractical considering the volume and weight involved.

Therefore, it is the primary object of the present invention to provide a drilling device which adjusts the speed to the diameter of the drilling tool so that a basically constant cutting speed is possible. In accordance with the invention, the desired speed characteristic is accomplished by fitting a gear wheel on the drilling tool and adjusting the distance between the axes of the spindle and the intermediate gear driving the drilling tool.

By this coordination of the gear wheel and the drilling tool, errors are excluded. The connection of the gear wheel on the drilling tool can be effected by a threaded engagement, a wedging action or safety rings. Since diamond tipped tools have a relatively long service life, the gear wheel can be directly welded onto the drilling tool.

Because of the different sizes of the gear wheels, the distance between the axes of the spindle and of the intermediate gear changes. To place the gear wheels in meshed engagement, the distance between the axes of the spindle and of the intermediate gear are adjustable. In the simplest way, this adjustability can be accomplished by slidably mounting the intermediate gear in a slot and clamping it in the desired position concentric to the driving pinion. Instead of a slot, however, several bores can be afforded to receive the axle of the intermediate gear.

During work with different drilling tools, the cutting speed is to be maintained as constant as possible for a particular material. To achieve this characteristic, it is preferable if the rolling circle diameter of the gear wheel is proportional to the outer diameter of the drilling tool. Therefore, a smaller tool diameter results in a higher speed of the spindle and, in turn, a constant cutting speed.

Basically the diameter of the gear wheel can be selected at random relative to the outside diameter of the drilling tool. Practical experience, however, has shown that it is advantageous when the rolling circle diameter of the gear wheel essentially to the outside diameter of the drilling tool. When dimensioned in this manner it is guaranteed that the gear-tooth system withstands the occurring stresses. Furthermore, excessive material requirements are avoided. This arrangement also facilitates the handling of the drilling tools.

The adjustment of the distance between the axes and consequently the gear play (or backlash) required for operation requires a considerable amount of technical knowledge. To facilitate the adjustment, it is helpful to provide a spacer disc on each of the intermediate gear and the gear wheel with the line of contact of the discs corresponding to the outside diameter of the drilling tool. By means of these spacer discs, the adjustment of the axis spacings is significantly easier. After the intermediate gear has been loosened, it can be shifted relative to the gear wheel until the two spacer discs are in contact. In this way, the correct axes spacing is set automatically. The meshed engagement of the gears is not impeded by this contact between the spacer discs, because the discs roll on one another.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE INVENTION

DETAILED DESCRIPTION OF THE INVENTION

Figure 1:
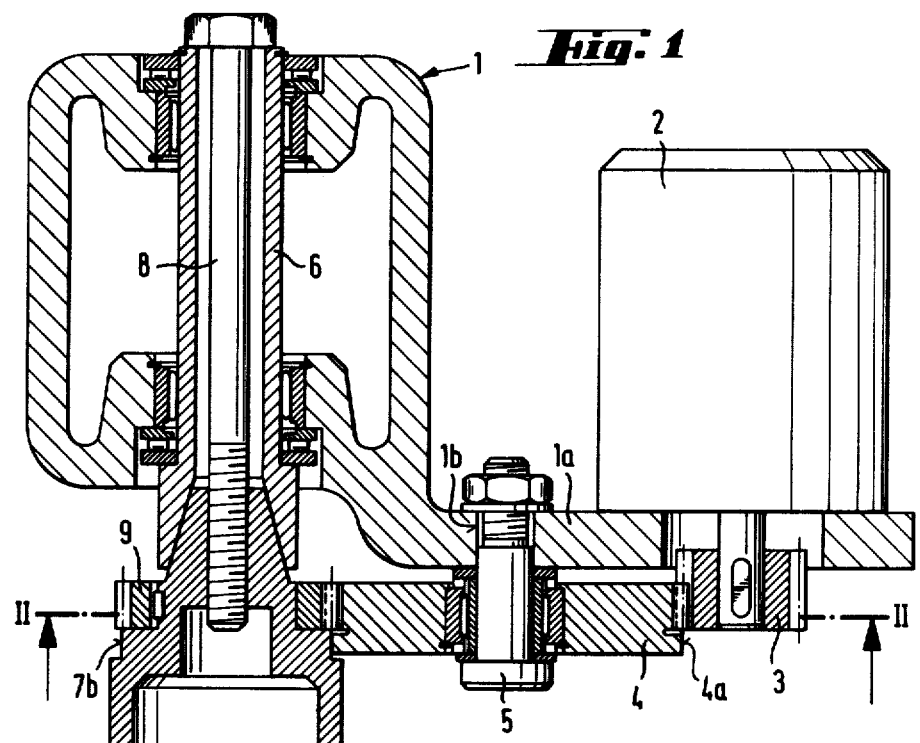
FIG. 1 is a view, partly in section, of a drilling device embodying the present invention taken along the line I—I in FIG. 2.

In FIG. 1 a drilling device embodying the present invention is shown, including a housing 1 having a laterally extending flange 1a projecting from one side of the housing with a motor 2 mounted on the flange. A driving pinion 3 projects downwardly from the motor 2 through the flange 1a. Driving pinion 3 is in meshed engagement with an intermediate gear 4 attached to the flange 1a by means of a bolt 5. Within the housing 1, a spindle 6 is rotatably mounted. A drilling tool or bit 7 is secured on the lower end of the spindle by means of a threaded bolt 8. Drilling tool 7 is a hollow crown drill and its front cutting edge is equipped with cutting diamonds 7a. A gear wheel 9 is secured on the drilling tool 7 and is in meshed engagement with the intermediate gear 4. In other words, the intermediate gear 4 transmits the driving action from the motor 2 to the drilling tool 7. The diameter of the rolling circle of the gear wheel 9 corresponds essentially to the outside diameter of the drilling tool 7. Spacer discs 4a, 7b in contact along the circumference of the rolling circle are located on the intermediate gear 4 and the drilling tool 7, respectively. These spacer discs 4a, 7b serve in adjusting the spacing between the axes of the spindle 6 and the intermediate gear 4.

Figure 2:
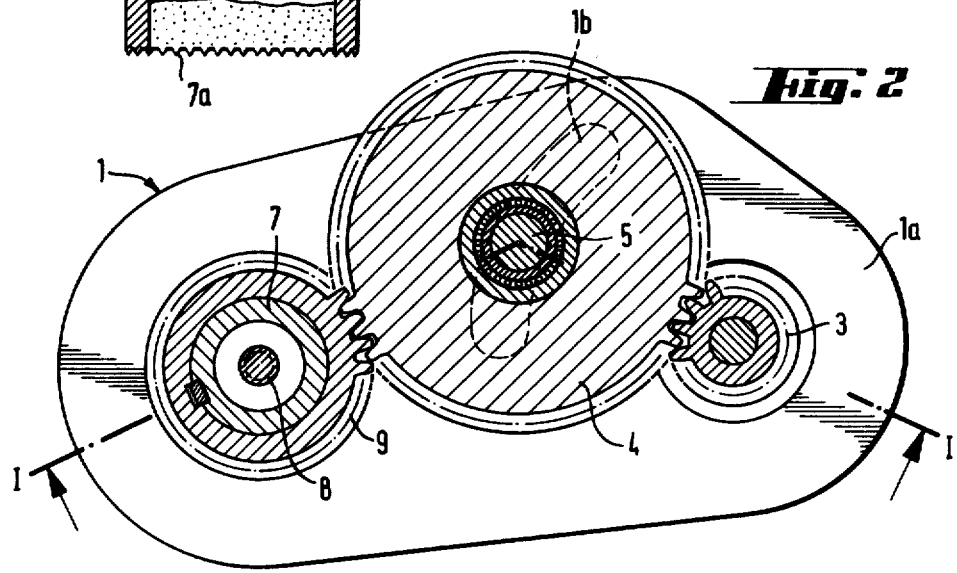
FIG. 2 is a sectional view of the device taken along the line II—II in FIG. 1.

In the section through the device illustrated in FIG. 2, the driving pinion 3 is in meshed engagement with the intermediate gear 4 and, in turn, the intermediate gear is in meshed engagement with the gear wheel 9. By means of the bolt 5, the intermediate gear is slidably positionable in a slot 1b in the flange 1a. The slot 1b is curvilinear and concentric to the axis of the driving pinion 3. The slidable adjustability of the intermediate gear 4 permits an adjustment of the spacing between the axes of the intermediate gear and of the spindle 6 or the gear wheel 9. Accordingly, depending on the diameter of the drilling tool 7, the speed ratio between the driving pinion 3 and the spindle 6 can be selected so that the drilling tool rotates at a specific speed. In the present case, the diameter of the rolling circle of the gear wheel 9 corresponds closely to the outside diameter of the drilling tool 7.

Figure 3A:
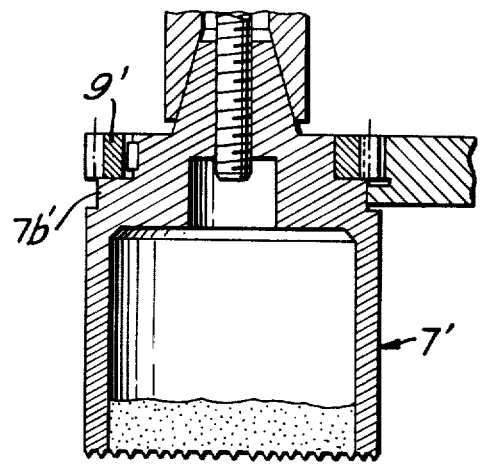
FIGS. 3a and 3b illustrate additional drilling tools of different diameters for use in the drilling device shown in FIG. 1.
Figure 3B:
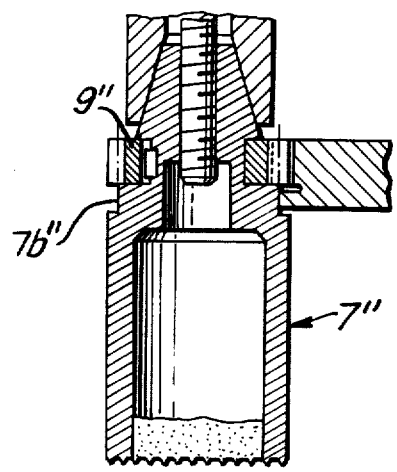

In FIGS. 3a and 3b two drilling tools 7',7" are illustrated each having a different diameter and each diameter being different from the diameter of the tool 7 in FIG. 1. Each drilling tool 7', 7" has a corresponding gear wheel 9', 9", cutting diamonds 7a', 7a" and spacers discs 7b', 7b".

While specific embodiments of the invention have been shown and described in detail to illustrate the application of the inventive principles, it will be understood that the invention may be embodied otherwise without departing from such principles.

What is claimed is:

1. Device for drilling rock, concrete, reinforced concrete and similar materials comprising a housing, a spindle located within said housing and rotatable about an axis therein, a replaceable drilling tool connectably mounted on said spindle for rotation therewith, a driving pinion located in said housing laterally of said spindle, an intermediate gear positionable in meshed engagement with said driving pinion, a gear wheel driven by said driving pinion via said intermediate gear and said gear wheel arranged to transfer rotational movement to said drilling tool, wherein the improvement comprises that said gear wheel is mounted on said drilling tool, the spacing between said intermediate gear and said spindle being adjustable with the spacing between said intermediate gear and said driving pinion being maintained the same, the diameter of the rolling circle of said gear wheel corresponds essentially to the outside diameter of said drilling tool, and said drilling tool comprising a plurality of drilling tools each of a different diameter and selectively individually replaceably connected to said spindle and the relation between the diameter of said gear wheel and of the outside diameter of said drilling tools affords the correct constant cutting speed for a specific material.

2. Device, as set forth in claim 1, wherein said housing laterally enclosing said spindle, said housing including a flange extending laterally outwardly transversely of the axial direction of said spindle, and means for securing said intermediate gear to said flange so that the spacing between the axis of said intermediate gear and said spindle is adjustable.

3. Device, as set forth in claim 2, wherein said flange having a curvilinear slot therein concentric to the axis of said driving pinion with said intermediate gear being slidably positionable along said slot and being securable in said slot at a desired position for adjustably securing the axis of said intermediate gear relative to the axis of said spindle.

* * * * *